（12) United States Patent
Bultman

(10) Patent No.: US 9,202,037 B2
(45) Date of Patent: Dec. 1, 2015

(54) SYSTEM AND METHOD FOR USING MACHINE READABLE CODE TO COMMISSION DEVICE APPLICATIONS

(75) Inventor: Robert Marten Bultman, Louisville, KY (US)

(73) Assignee: General Electric Company, Schenectady, NY (US)

( * ) Notice: Subject to any disclaimer, the term of this patent is extended or adjusted under 35 U.S.C. 154(b) by 9 days.

(21) Appl. No.: 13/491,965

(22) Filed: Jun. 8, 2012

(65) Prior Publication Data

US 2013/0332995 A1   Dec. 12, 2013

(51) Int. Cl.
*H04L 29/06* (2006.01)
*G06F 21/36* (2013.01)

(52) U.S. Cl.
CPC ............ *G06F 21/36* (2013.01); *H04L 63/0853* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 7,453,217 B2* | 11/2008 | Lys et al. | 315/291 |
| 7,478,755 B2* | 1/2009 | Sekiguchi | 235/462.24 |
| 8,770,771 B2* | 7/2014 | Preta et al. | 362/20 |
| 2005/0064905 A1* | 3/2005 | Pinder | 455/557 |
| 2006/0208088 A1* | 9/2006 | Sekiguchi | 235/472.02 |
| 2007/0228171 A1* | 10/2007 | Thiyagarajah | 235/462.09 |
| 2007/0241194 A1* | 10/2007 | Lin et al. | 235/462.01 |
| 2008/0304747 A1* | 12/2008 | Marinkovich et al. | 382/183 |
| 2009/0277955 A1* | 11/2009 | Sathiananthan et al. | 235/375 |
| 2011/0302282 A1* | 12/2011 | Dadlani Mahtani et al. | 709/221 |
| 2012/0158919 A1* | 6/2012 | Aggarwal et al. | 709/220 |
| 2012/0158922 A1* | 6/2012 | Aggarwal et al. | 709/220 |
| 2012/0169254 A1* | 7/2012 | Van Doorn | 315/297 |
| 2012/0276851 A1* | 11/2012 | Layne et al. | 455/41.2 |
| 2012/0312874 A1* | 12/2012 | Jonsson | 235/385 |
| 2013/0024685 A1* | 1/2013 | Kolavennu et al. | 713/153 |
| 2013/0050259 A1* | 2/2013 | Ahn et al. | 345/633 |
| 2013/0069781 A1* | 3/2013 | Terwilliger et al. | 340/539.13 |
| 2013/0200142 A1* | 8/2013 | Larson et al. | 235/375 |
| 2013/0223279 A1* | 8/2013 | Tinnakornsrisuphap et al. | 370/254 |
| 2013/0250357 A1* | 9/2013 | Yu | 358/1.15 |
| 2013/0250358 A1* | 9/2013 | Suzuki | 358/1.15 |
| 2013/0276075 A1* | 10/2013 | Gong et al. | 726/5 |
| 2013/0344811 A1* | 12/2013 | Tolhuizen et al. | 455/41.2 |
| 2014/0045472 A1* | 2/2014 | Sharma et al. | 455/416 |

FOREIGN PATENT DOCUMENTS

JP   2008225701 A   *   9/2008

* cited by examiner

*Primary Examiner* — Michael R Vaughan
(74) *Attorney, Agent, or Firm* — Dority & Manning, P.A.

(57) ABSTRACT

A system for using machine readable code to commission a device application includes a controller, an image capturing device, and at least one processor. The at least one processor is programmed to receive an image acquired from the image capturing device, wherein the image includes a code, the at least one processor is also programmed to access information from the code, and send the information accessed from the code to the controller, wherein the information enables the controller to commission a device application.

18 Claims, 2 Drawing Sheets

SYSTEM AND METHOD FOR USING MACHINE READABLE CODE TO COMMISSION DEVICE APPLICATIONS

BACKGROUND OF THE INVENTION

The field of the invention relates generally to device management, and more specifically, to a system and method for using machine readable code to commission one or more device applications.

Passwords that require long sequences of numbers and letters are typically used in applications that require high security. In addition, product model numbers, installation codes, and application setup often require users to manually enter long sequences of number/letters and/or information. A length of these sequences and/or an amount of information needed to be entered is related to the level of security (e.g., longer sequences and more information are typically associated with higher levels of security); however, long sequences/information can be difficult to manually enter without error. While some errors can be eliminated by redesigning processes to reduce a number of human-performed steps and create a more efficient workflow once processes have been optimized, further error reductions can only be achieved by "reassigning" tasks to automated instruments which are known to perform these tasks more reliably than humans. However, some tasks cannot be "reassigned" by conventional automated systems as the reassignment is either impractical or does not currently exist.

BRIEF SUMMARY OF THE INVENTION

In one aspect, a system for using machine readable code to commission a device application is provided. The system includes a controller, an image capturing device, and at least one processor. The at least one processor is programmed to receive an image acquired from the image capturing device, wherein the image includes a code, the at least one processor is also programmed to access information from the code, and send the information accessed from the code to the controller, wherein the information enables the controller to commission a device application.

In another aspect, a method using machine readable code to commission a device application is provided. The method includes receiving an image acquired from an image capturing device, wherein the image includes a code. The method also includes accessing information from the code, and sending the information accessed from the code to a controller, wherein the information enables the controller to commission a device application.

In yet another aspect, an image capturing device is provided. The image capturing device includes a processor programmed to receive an image acquired from the image capturing device, wherein the image includes a code. The processor is also programmed to access information from the code, and send the information accessed from the code to a controller, wherein the information enables the controller to commission a device application.

BRIEF DESCRIPTION OF THE DRAWINGS

The present disclosure is described in detail below with reference to the attached drawing figures.

DETAILED DESCRIPTION OF THE INVENTION

While embodiments of the disclosure are illustrated and described herein with reference to device management, and more specifically, to a system and method for using machine readable code to commission one or more device applications, aspects of the disclosure are operable with any system that performs the functionality illustrated and described herein, or its equivalent.

The present disclosure enables use of hand-held devices, such as smartphones coupled with cameras and/or tablet computers coupled with cameras, to read configuration information from a machine-readable code from a device that is to be configured or commissioned (e.g., given authority to carry out one or more tasks). In one embodiment, the machine-readable code is a matrix code or two-dimensional code, such as a Quick Response code (QR-Code®). The hand-held device uses the configuration information to establish communications with the device and other devices. By enabling configuration information to be read in this way, the present disclosure eliminates a need for a user to enter information manually while at the same time, eliminating errors associated with manual entry. Further, by using a cell phone or other connected device owned by the user, such as a tablet computer, aspects of the present disclosure can be delivered without additional product or system cost.

Various aspects of the technology described herein are generally directed towards locating a two-dimensional barcode symbol. While some of the examples described herein are directed towards a QR-Code® barcode symbol, it is understood that these are only examples. For example, other symbols including other types of barcodes that have identifiable signatures are also contemplated. As such, the present disclosure is not limited to any particular embodiments, aspects, concepts, structures, functionalities or examples described herein. Rather, any of the embodiments, aspects, concepts, structures, functionalities or examples described herein are non-limiting, and the present disclosure may be used various ways that provide benefits and advantages in computing and image processing in general.

Figure 1:
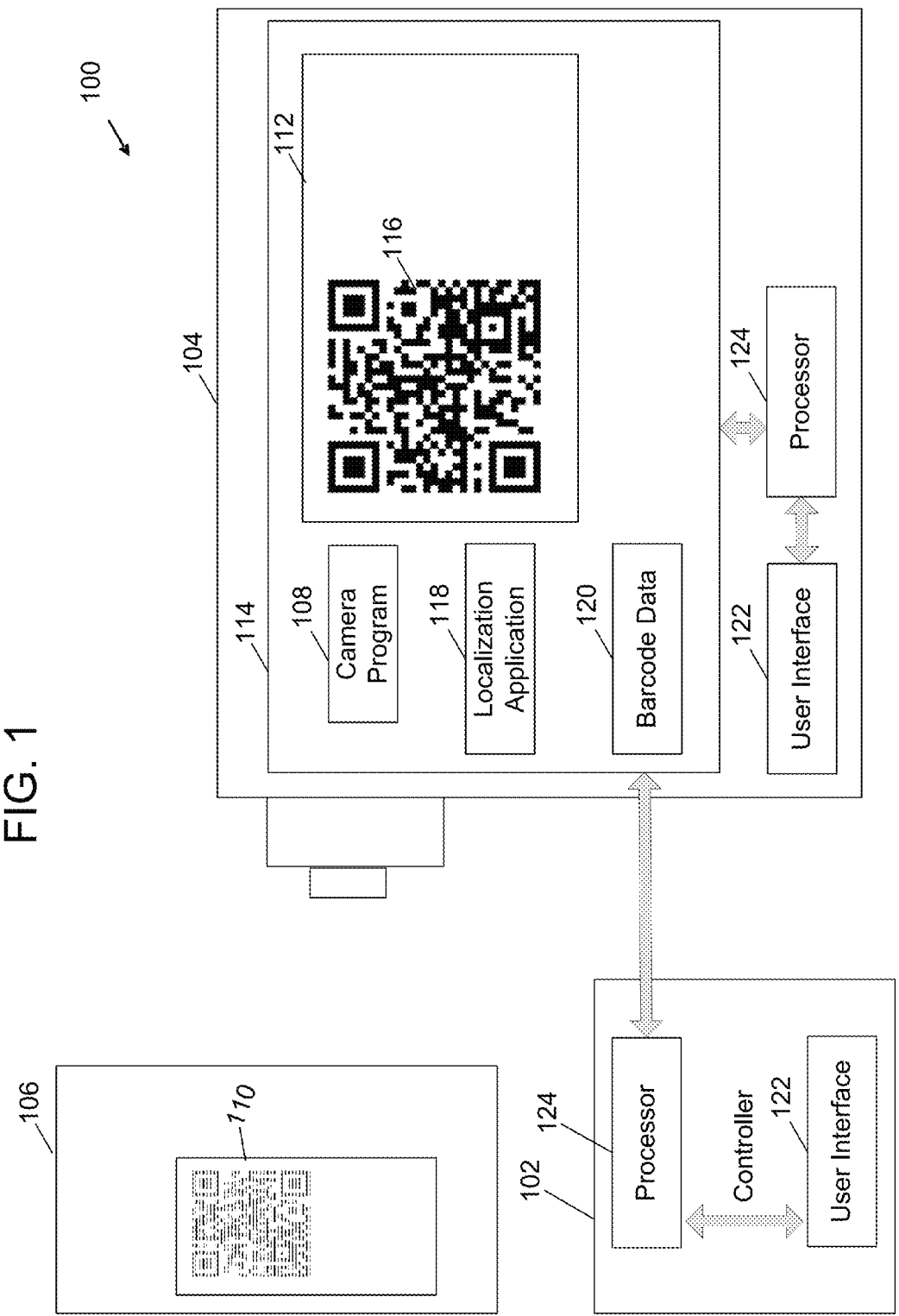
FIG. 1 is a block diagram of a system for using machine readable code to commission one or more device applications.

With reference to FIG. 1, a block diagram of a system 100 for using machine readable code to commission one or more device applications is provided. System 100 includes a controller 102, a mobile device 104, and a device 106. In one embodiment, controller 102 and device 106 may be components of and/or coupled with an appliance, a building system or a computer. Non-limiting examples of appliances include a refrigerator, a washer, a dryer, an oven, a stove, a microwave oven, a dishwasher. A non-limiting example of building system is a heating, ventilation, and air conditioning system, or the like. Further, mobile device 104 may be a personal computer, personal digital assistant, smartphone, camera, laptop, or tablet computer.

In one embodiment, controller 102 and mobile device 104 are configured to communicate using the IEEE 802.15.4 protocol. In one embodiment, controller 102 is a ZIGBEE® coordinator. For example, controller 102 may be configured to search for a suitable radio channel (e.g., a radio channel that has least activity) using 802.15.4 protocol, initiate an 802.15.4 network by assigning a PAN ID to a 802.15.4 network, and allow routers and end devices to join the PAN.

In one embodiment, mobile device 104, via a camera program 108, captures an initial image of a machine-readable code 110 off of device 106 to obtain a containing image 112 in memory 114. Containing image 112 includes a two-dimensional barcode 116, such as, a QR Code®.

A localization application 118 (e.g., initiated by a device user) is configured to locate two-dimensional barcode 116 within containing image 112. The result is barcode data 120 (e.g., in the form of a bounding box surrounding barcode 116, which may be in the same memory location or copied to a different location) for use as needed by the user.

As will be understood, localization application 118 requires limited manual labor, as a user need only point mobile device 104 in the general direction of a QR Code® for camera program 108. Localization application 118 is robust in that it can reliably locate a QR Code® within a containing image that suffers from low lighting, image noise/visual artifacts, a skewed capture angle and or focal distortion/blurriness. Additionally, the performance is fast enough on contemporary mobile devices to be considered real-time with respect to consumer use. Thus, the technology described herein is reliable even in poor environmental conditions, yet is sufficiently lightweight to maintain high computational performance even for devices with limited hardware capabilities. In one embodiment, localization application 118 identifies position detectors located at three corners of a QR Code® by scanning an entire image using a pattern recognition algorithm. Using the position detectors, a bounding box is applied around the QR Code®. In another embodiment, localization application 118 divides an image into blocks of pixels and runs a pattern recognition algorithm to find patterns, colors (e.g., black and white) within each block that are unique to a QR Code® or unique to portions of a QR Code®, such as position detectors. Once location application 118 has identified a QR Code®, location application 118 can resize and/or rotate the QR Code® to optimize scanning the QR Code®, as well as apply a bounding box around the QR Code®.

In one embodiment, controller 102 and/or mobile device 104 may include a user interface 122, which may be a capacitive touch screen display configured to be responsive to a user pressing contact on a screen to selectively perform functionality. Thus, a user can operate the desired functions by contacting a surface of the control panel/user interface 122 as well as other functions provided herein.

At least one processor 124 executes computer-executable instructions for implementing aspects of the disclosure. In some embodiments, at least one processor 124 is transformed into a special purpose microprocessor by executing computer-executable instructions or by otherwise being programmed. For example, at least one processor 124 is programmed with instructions such as illustrated below with respect to FIG. 2.

Figure 2:
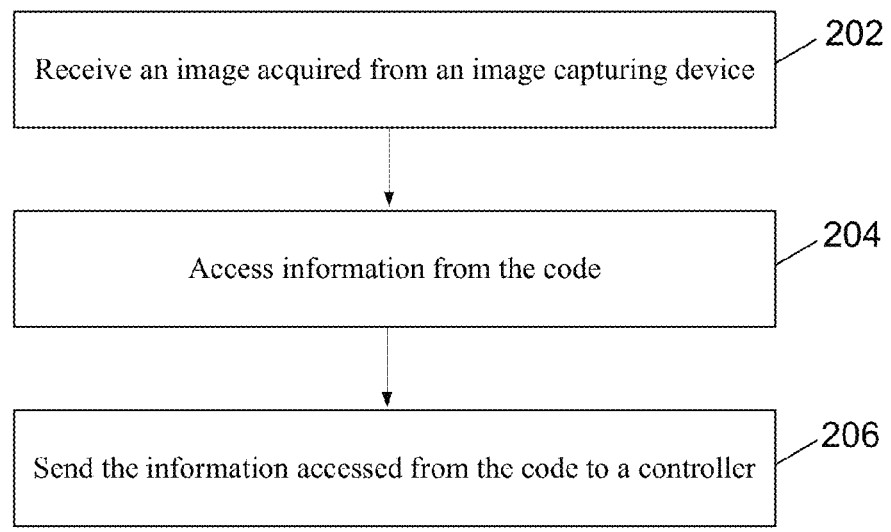
FIG. 2 is a process flow diagram for using machine readable code to commission one or more device applications.

Referring next to FIG. 2, a process flow diagram for using machine readable code to commission one or more device applications is provided. At 202, an image acquired from an image capturing device (e.g., mobile device 104 shown in FIG. 1) is received. In one embodiment, the image includes a code, such as a two-dimensional barcode (e.g., two-dimensional barcode 116 shown in FIG. 1). In one embodiment, the code is a QR Code®. At 204, information from the code is accessed by decoding the information written behind the code. The information may include a media access control address and an install code for enabling a device (e.g., device 106 shown in FIG. 1) to join a ZIGBEE® network or other network. In addition, the information may include a WI-FI router SSID, an encryption type, a passcode, and/or entry information for a warranty card. As such, the media access control address and install code are used to commission, for example, a device configured to communicate using the IEE 802.15.4 protocol with an existing ZIGBEE network.

At 206, the information accessed from the code is sent to a controller (e.g., controller 102 shown in FIG. 1). In one embodiment, the information enables controller 102 to commission a device application. For example, upon receipt and verification of the media access control address and the install code, controller 102 authorizes device 106 to join a ZIGBEE network.

Exemplary Operating Environment

A controller or computing device such as described herein has one or more processors or processing units, system memory, and some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal, such as a carrier wave or other transport mechanism, and include any information delivery media. Combinations of any of the above are also included within the scope of computer readable media.

The controller/computer may operate in a networked environment using logical connections to one or more remote computers, such as a remote computer. Although described in connection with an exemplary computing system environment, embodiments of the present disclosure are operational with numerous other general purpose or special purpose computing system environments or configurations. The computing system environment is not intended to suggest any limitation as to the scope of use or functionality of any aspect of the present disclosure. Moreover, the computing system environment should not be interpreted as having any dependency or requirement relating to any one or combination of components illustrated in the exemplary operating environment. Examples of well-known computing systems, environments, and/or configurations that may be suitable for use with aspects of the present disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, tablet computers, distributed computing environments that include any of the above systems or devices, and the like.

Embodiments of the present disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the present disclosure may be implemented with any number and organization of such components or modules. For example, aspects of the present disclosure are not limited to the specific computer-executable instructions or the specific components or modules illustrated in the figures and described herein. Other embodiments of the present disclosure may include different computer-executable instructions or components having more or less functionality than illustrated and described herein. Aspects of the present disclosure may also be practiced in distributed computing environments where tasks are performed by remote processing devices that are linked through a communications network. In a distributed computing environment, program modules may be located in both local and remote computer storage media including memory storage devices.

Aspects of the present disclosure transform a general-purpose computer into a special-purpose computing device when configured to execute the instructions described herein.

The order of execution or performance of the operations in embodiments of the present disclosure illustrated and described herein is not essential, unless otherwise specified. That is, the operations may be performed in any order, unless otherwise specified, and embodiments of the present disclosure may include additional or fewer operations than those disclosed herein. For example, it is contemplated that executing or performing a particular operation before, contemporaneously with, or after another operation is within the scope of aspects of the present disclosure.

When introducing elements of aspects of the present disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the present disclosure in detail, it will be apparent that modifications and variations are possible without departing from the scope of aspects of the present disclosure as defined in the appended claims. As various changes could be made in the above constructions, products, and methods without departing from the scope of aspects of the present disclosure, it is intended that all matter contained in the above description and shown in the accompanying drawings shall be interpreted as illustrative and not in a limiting sense.

This written description uses examples to disclose the claimed subject matter, including the best mode, and also to enable any person skilled in the art to practice the claimed subject matter, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for using machine readable code to commission a device application, the system comprising:
    a first device comprising a controller in the first device coupled to a machine readable image; and
    a second device comprising:
        an image capturing device; and
        at least one processor programmed to:
            acquire the machine readable image from the image capturing device, the machine readable image comprising a code with information including a router identification;
            access the information from the code; and
            send the information accessed from the code to the controller in the first device, wherein the controller in the first device is configured to, responsive to receiving the information accessed from the code, verify the information accessed from the code and, upon verification, to commission a device application for enabling the first device to join a network using the identified router;
    wherein the controller in the first device comprises a network coordinator configured to allow one or more routers or one or more end devices to join the network.

2. The system of claim 1, wherein the code is a quick response code and wherein the information includes a media access control address and an install code for enabling the first device to join the network.

3. The system of claim 2, wherein upon receipt and verification of the media access control address and the install code, the controller authorizes the first device to join the network.

4. The system of claim 2, wherein the first device is an appliance.

5. The system of claim 1, wherein the second device is one of a smartphone and a tablet computer.

6. The system of claim 1, wherein the information includes one or more of the following: a WI-FI router SSID, an encryption type, and a passcode.

7. The system of claim 1, wherein the information includes entry information for a warranty card.

8. The system of claim 1, wherein the code is a bar code.

9. The system of claim 1, wherein the code is a non-graphical machine-readable code.

10. A method using machine readable code to commission a device application, the method comprising:
    using an image capturing device to acquire a machine readable image from a device comprising a controller in the device coupled to the machine readable image, the machine readable image comprising a code with information including a router identification;
    accessing the information from the code; and
    sending the information accessed from the code to the controller in the first device, wherein the controller in the first device is configured to, responsive to receiving the information accessed from the code, verify the information accessed from the code and, upon verification, to commission a device application for enabling a second device to join a network using the identified router;
    wherein the controller in the first device comprises a network coordinator configured to allow one or more routers or one or more end devices to join the network.

11. The method of claim 10, wherein the code is a quick response code and wherein the information includes a media access control address and an install code for enabling the device to join the network.

12. The method of claim 11, wherein upon receipt and verification of the media access control and the install code, the controller authorizes the device to join the network.

13. One or more tangible, non-transitory computer-readable media storing computer-readable instructions that when executed by one or more processors cause the one or more processors to perform operations, the operations comprising:
    acquire a machine readable image from a separate device comprising a controller in the separate device coupled to the machine readable image, the machine readable image comprising a code with information including a router identification;
    access the information from the code; and
    send the information accessed from the code to the controller in the separate device, wherein the controller in the separate device is configured to, responsive to receiving the information accessed from the code, verify the information accessed from the code and, upon verification, to commission a device application for enabling the separate device to join a network using the identified router;

wherein the controller in the separate device comprises a network coordinator configured to allow one or more routers or one or more end devices to join the network.

14. The one or more tangible, non-transitory computer-readable media of claim 13, wherein the code is a quick response code and wherein the information includes a media access control address and an install code for enabling the separate device to join the network.

15. The one or more tangible, non-transitory computer-readable media of claim 14, wherein upon receipt and verification of the media access control and the install code, the controller authorizes the separate device to join the network.

16. The one or more tangible, non-transitory computer-readable media of claim 13, wherein the separate device is an appliance.

17. The one or more tangible, non-transitory computer-readable media of claim 13, wherein the information includes one or more of a WI-FI router SSID, an encryption type, a passcode, and entry information for a warranty card.

18. The one or more tangible, non-transitory computer-readable media of claim 13, wherein the image capturing device is one of a smartphone and a tablet computer.

* * * * *